Patented Nov. 25, 1924.

1,516,868

UNITED STATES PATENT OFFICE.

JOSEPH J. SELDAGE, OF SPOKANE, WASHINGTON.

EXTERMINATOR FOR RODENTS, ETC.

No Drawing.   Application filed December 15, 1922.   Serial No. 607,230.

*To all whom it may concern:*

Be it known that I, JOSEPH J. SELDAGE, a citizen of the United States, residing at Spokane, in Spokane County, and State of Washington, have invented certain new and useful Improvements in Exterminators for Rodents, Etc., of which the following is a specification.

The present invention relates to an improved exterminator for rodents, such as rats, mice, but particularly to squirrels of the ground burrowing specie wherein their nests or habitations may be found under ground in burrows and the like.

The primary object of the invention is the provision of a composition in the form of a liquid that may be handled or used with facility and is designed to saturate a cloth or absorbent medium by dipping in the solution, in order that the absorbent material or medium when so saturated may be deposited in the burrow and subsequently give forth noxious gases or fumes within the burrow or habitation of the rodents.

Thus the invention contemplates the employment of a rag or wad of cotton waste, or some other absorbent material that can be readily saturated with the liquid solution and from which noxious gases will flow through evaporation for the purpose of forming fumes to destroy the life of the animal or rodent.

The application of my exterminator is of the greatest importance and involves the saturation of the aforesaid absorbent material and the placing of it within the hole or burrow. This placement should be at a point barely inside the entrance to the burrow and a fill of rock or other object approximately the size of the hole should immediately be placed over the saturated absorbent. The hole then must be completely stopped to exclude the entrance of air, preferably by depositing a shovel or two of earth over the top of the hole and tamping the same in place.

My experiments over considerable period of time have demonstrated that this method of depositing the treatment will secure the best results as I have been able to determine that whenever the fumes emanating from the saturated body have traveled along the passageways the air becomes infected and the animal immediately tries to reach the open air. In doing this he finally reaches the entrance of the habitation and as this has been previously closed it is necessary for him to burrow with his face in close proximity to the saturated medium from which the fumes are emanating and thus before much work can be accomplished the fumes will have taken effect and destroyed the animal. If deposit of the saturated medium is made at any other place than the above there is less chance of a one hundred per cent kill. For instance, if the medium is placed several feet within the hole the animal is enabled to pass the saturated medium and more readily effect his escape by digging out.

In the preparation of the exterminator I preferably utilize a volatile agent or medium as gasoline as a base for the solution and add thereto an equal quantity by measure of carbon bisulphide. The gasoline is placed in the mixing chamber and with the addition thereto of the carbon bisulphide the solution is stirred to thoroughly mix and to this mixture is added a quantity of vegetable coloring matter, such as a chlorophyl solution. It may then be bottled or placed in suitable containers and closed until ready for use as desired. The gasoline and carbon bisulphide when combined form a solution from which noxious gases emanate when the solution is exposed for evaporation and these gases perform the function of an exterminator. By dipping a wad of rag or cotton waste or similar absorbent material in the solution sufficient of the solution will be absorbed for the purpose required. It will be understood, however, that according to the size of the animal, or the number that may be found in any run, a larger quantity of the solution may be used as desired. I find that the best results are secured in the use of a solution made up as follows:

Gasoline one gallon carbon bisulphide one gallon and a vegetable coloring made to be added in quantity sufficient to color or die the compound as desired.

I claim:—

A solution composed of the following ingredients in the following proportions:— gasoline one gallon, carbon bisulphide one gallon, sul. chlorophyl one ounce.

In testimony whereof I affix my signature.

JOSEPH J. SELDAGE.